United States Patent
Lohmann et al.

(10) Patent No.: US 9,555,835 B2
(45) Date of Patent: Jan. 31, 2017

(54) BODY STRUCTURE, IN PARTICULAR FLOOR STRUCTURE, FOR A MOTOR VEHICLE

(71) Applicant: VOLKSWAGEN AKTIENGESELLSCHAFT, Wolfsburg (DE)

(72) Inventors: Bernard Lohmann, Gifhorn (DE); Werner Krauth, Wolfsburg (DE); Thorben Bösche, Wolfsburg (DE); Gwendolin Schifferli, Bahrdorf-Saalsdorf (DE); Martin Steinrücken, Gifhorn (DE); Stefan Thiele, Braunschweig (DE); Jürgen Hillmann, Gifhorn (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 14/709,956

(22) Filed: May 12, 2015

(65) Prior Publication Data

US 2015/0239504 A1  Aug. 27, 2015

Related U.S. Application Data

(62) Division of application No. 13/697,492, filed as application No. PCT/EP2011/002292 on May 9, 2011, now Pat. No. 9,056,633.

(30) Foreign Application Priority Data

May 10, 2010 (DE) .................. 10 2010 019 992

(51) Int. Cl.
*B60J 7/00* (2006.01)
*B62D 21/15* (2006.01)
(Continued)

(52) U.S. Cl.
CPC ............. *B62D 21/155* (2013.01); *B62D 21/15* (2013.01); *B62D 25/025* (2013.01); *B62D 25/20* (2013.01);
(Continued)

(58) Field of Classification Search
CPC .... B62D 21/20; B62D 21/152; A61M 5/2033; A61M 2005/206; B60G 2204/148; H01J 2229/0722; H01J 29/07; H01L 2924/00014; E04B 1/2403; E04B 2001/2448
(Continued)

(56) References Cited

U.S. PATENT DOCUMENTS

| 3,912,295 A * | 10/1975 | Eggert, Jr. ............... F16F 7/12 280/784 |
| 5,110,177 A * | 5/1992 | Akio ...................... B62D 21/11 280/784 |
| 5,114,184 A * | 5/1992 | Shimomura ......... B62D 21/155 280/784 |
| 6,234,568 B1 * | 5/2001 | Aoki ...................... B62D 21/07 296/203.04 |
| 6,705,668 B1 * | 3/2004 | Makita ................... B62D 21/15 296/187.03 |
| 6,802,558 B2 * | 10/2004 | Matsuoka ............ B62D 25/087 296/193.08 |

(Continued)

FOREIGN PATENT DOCUMENTS

| DE | 600 10329 | 5/2005 |
| DE | 10 2004 044 925 B3 | 9/2005 |

(Continued)

OTHER PUBLICATIONS

International Search Report issued for PCT International Application No. PCT/EP2011/002292, mailed Aug. 16, 2011.
(Continued)

*Primary Examiner* — Kiran B Patel
(74) *Attorney, Agent, or Firm* — Pearl Cohen Zedek Latzer Baratz LLP

(57) ABSTRACT

The invention relates to a body structure, in particular a floor structure, for a motor vehicle, comprising support components that form defined load paths for crash situations. According to the invention, at least some of the support components located in the region of at least one defined load path, in particular a head-on collision load path and/or a side collision load path and/or a rear collision load path, are formed by high-strength support components, preferably by fully through-hardened or at least partially through-hardened high-strength support components which are made of (Continued)

a hot-formed or shape-hardened sheet steel and which are directly or indirectly, preferably directly, connected to each other, in particular connected to one another non-positively and/or positively and/or by bonding.

3 Claims, 5 Drawing Sheets

(51) Int. Cl.
  *B62D 25/02* (2006.01)
  *B62D 25/20* (2006.01)
  *B62D 29/00* (2006.01)
(52) U.S. Cl.
  CPC ......... *B62D 25/2027* (2013.01); *B62D 29/007* (2013.01)
(58) Field of Classification Search
  USPC ... 296/203.01, 204; 280/781, 785, 797, 800; 293/102, 120, 132
  See application file for complete search history.

(56) References Cited

U.S. PATENT DOCUMENTS

| | | | | |
|---|---|---|---|---|
| 7,080,875 B2* | 7/2006 | Kim | ............... | B62D 25/2036 296/187.09 |
| 7,090,290 B2* | 8/2006 | Neumeier | ............... | B62D 21/00 280/793 |
| 7,185,934 B2* | 3/2007 | Saeki | ............... | B62D 39/00 296/35.2 |
| 7,195,306 B2* | 3/2007 | Egawa | ............... | B62D 21/157 296/187.08 |
| 7,207,619 B2* | 4/2007 | Yamamoto | ............... | B60R 22/22 280/801.2 |
| D556,648 S | 12/2007 | Nelson et al. | | |
| 7,310,878 B2* | 12/2007 | Chernoff | ............... | B62D 25/20 29/421.1 |
| 7,513,329 B2* | 4/2009 | Nakashima | ............... | B60G 7/006 180/312 |
| 7,677,643 B2* | 3/2010 | Nakamura | ............... | B62D 25/20 296/187.08 |
| 7,699,385 B2* | 4/2010 | Kurata | ............... | B62D 25/2036 296/187.08 |
| 7,748,774 B2* | 7/2010 | Kurata | ............... | B62D 25/2018 296/187.08 |
| 7,887,123 B2* | 2/2011 | Honji | ............... | B62D 21/152 280/488 |
| 7,900,998 B2* | 3/2011 | Onoda | ............... | B62D 25/20 296/208 |
| 7,905,503 B2* | 3/2011 | Goto | ............... | B62D 25/087 280/124.109 |
| 7,905,541 B2* | 3/2011 | Yamaguchi | ............... | B62D 25/087 296/203.04 |
| 7,950,724 B2* | 5/2011 | Yamaguchi | ............... | B60K 15/063 296/187.11 |
| 7,976,091 B2* | 7/2011 | Yamaguchi | ............... | B62D 21/152 224/42.12 |
| 8,052,204 B2* | 11/2011 | Boettcher | ............... | B62D 21/02 280/785 |
| 8,075,047 B2* | 12/2011 | Yamada | ............... | B62D 25/04 296/193.09 |
| 8,177,293 B2* | 5/2012 | Boettcher | ............... | B62D 33/023 29/401.1 |
| 8,276,980 B2* | 10/2012 | Boettcher | ............... | B62D 25/2018 296/193.07 |
| 8,282,146 B2* | 10/2012 | Izutsu | ............... | B62D 25/087 296/187.11 |
| 8,282,154 B2* | 10/2012 | Maruyama | ............... | B62D 25/02 296/193.05 |
| 8,287,035 B2* | 10/2012 | Bufe | ............... | B62D 25/2036 296/192 |
| 8,398,158 B2* | 3/2013 | Mildner | ............... | B62D 25/20 296/187.08 |
| 8,449,024 B2* | 5/2013 | Pietroni | ............... | B29C 70/48 296/204 |
| 8,491,046 B2* | 7/2013 | Nagai | ............... | B62D 25/02 296/146.6 |
| 8,517,459 B2* | 8/2013 | Klimek | ............... | B62D 25/2036 296/193.07 |
| 8,556,336 B2* | 10/2013 | Yasuhara | ............... | B62D 21/11 296/193.07 |
| 8,585,133 B2* | 11/2013 | Yasuhara | ............... | B62D 21/11 296/187.09 |
| 8,646,833 B2* | 2/2014 | Fujii | ............... | B62D 21/157 296/187.08 |
| 8,668,248 B2* | 3/2014 | Ishizono | ............... | B62D 25/025 296/187.08 |
| 8,668,252 B2* | 3/2014 | Yasuhara | ............... | B62D 21/11 296/187.08 |
| 8,672,354 B2* | 3/2014 | Kim | ............... | B60K 1/04 180/68.5 |
| 8,708,403 B2* | 4/2014 | Herntier | ............... | B62D 25/08 280/781 |
| 8,720,981 B1* | 5/2014 | Shafer | ............... | B62D 25/025 296/187.08 |
| 8,720,985 B2* | 5/2014 | Izumi | ............... | B62D 25/025 296/187.12 |
| 8,752,885 B2* | 6/2014 | Yang | ............... | B62D 25/20 296/187.08 |
| 8,789,875 B2* | 7/2014 | Kageyama | ............... | B62D 21/10 29/897.2 |
| 8,813,888 B2* | 8/2014 | Ogawa | ............... | B62D 25/082 180/180 |
| 8,814,248 B2* | 8/2014 | Mildner | ............... | B62D 25/08 296/187.08 |
| 8,814,255 B2* | 8/2014 | Yamaji | ............... | B62D 25/20 296/193.07 |
| 8,857,899 B2* | 10/2014 | Matsuda | ............... | B62D 25/00 296/187.12 |
| 8,919,865 B2* | 12/2014 | Ogawa | ............... | B62D 25/08 296/187.11 |
| 8,960,776 B2* | 2/2015 | Boettcher | ............... | B62D 33/023 296/193.07 |
| 9,308,805 B2* | 4/2016 | Shiromura | ............... | B60K 1/04 |
| 2004/0113462 A1* | 6/2004 | Winter | ............... | B62D 25/08 296/203.02 |
| 2005/0140179 A1* | 6/2005 | Morsch | ............... | B62D 25/2018 296/204 |
| 2007/0107819 A1 | 5/2007 | Gehringhoff et al. | | |
| 2008/0122213 A1* | 5/2008 | Xu | ............... | B62D 21/02 280/781 |
| 2009/0289476 A1* | 11/2009 | Bufe | ............... | B62D 25/2036 296/204 |
| 2013/0214558 A1 | 8/2013 | Lohmann et al. | | |
| 2013/0270871 A1* | 10/2013 | Bosche | ............... | B62D 25/2018 296/204 |
| 2014/0001790 A1* | 1/2014 | Zischke | ............... | B62D 25/2018 296/187.03 |
| 2014/0117716 A1* | 5/2014 | Patberg | ............... | B62D 21/157 296/187.08 |

FOREIGN PATENT DOCUMENTS

| | | |
|---|---|---|
| DE | 10 2004 037 789 | 12/2005 |
| DE | 10 2004 037 789 B3 | 12/2005 |
| DE | 102004021553 A1 | 12/2005 |
| DE | 10 2004 049 976 | 4/2006 |
| DE | 10 2005 039 400 | 2/2007 |
| DE | 10 2006 052 992 | 5/2008 |
| EP | 1 149 756 A2 | 10/2001 |
| EP | 1 270 375 A1 | 1/2003 |
| EP | 1382514 | 1/2004 |
| EP | 1382514 A1 | 1/2004 |
| EP | 2 143 621 A1 | 1/2010 |
| EP | 2143621 | 1/2010 |
| FR | 2945267 | 11/2010 |
| WO | WO 01/45999 | 6/2001 |

(56) References Cited

FOREIGN PATENT DOCUMENTS

| WO | WO 2004/076266 | 9/2004 |
|---|---|---|
| WO | WO 2004/076266 A2 | 9/2005 |
| WO | WO 2005/108193 A1 | 11/2005 |
| WO | WO 2008/153480 | 12/2008 |

OTHER PUBLICATIONS

Search Report issued for German Patent Application DE 102010 019 992.3, mailed Nov. 5, 2012.
Office Action issued for Korean Patent Application No. 9-5-2013-084880053, dated Dec. 5, 2013.
Thomas Hahn, Markus Rebele Rainer Weiss, "The Audi Q5, a New Member of Audi B Model Range," Presentation on Oct. 23, 2008 at Euro Car Body Award 2008 (which is open to the public).
Dr. Stefan Floeck, Dr. Markus Pfestorf, BMW AG, "Die Karosserie des neuen BMW 7er," Aachener Karosserietage 2008, pp. 103-117.
Fachkunde Fahrzeugtechnik, 29. Auflage, Paderborn, 2009, p. 412.
Slides of Markus Pfestorf and Jacobus Van Rendsburg, BMW AG, with the slides being presented by the presentation "Functional Properties of High Strength Steel in the Body in White" at "Great Designs in Steel (GDIS) 2006" on Aug. 3, 2006; These slides are accessible on the internet page "http://www.autosteel.org/Great%20Designs%20in%20Steel/Past%20GDIS%20Presentations/GDIS%202012.aspx".
Daylan Altan, "Hot-stamping boron-alloyed stell for automotive parts—Part I: Process methods and uses" in: Stamping Journal, Dec. 2006.
Third Party Observations Referring to the European Patent Application EP 2 569 211 based on PCT/EP2011/002292 filed on Nov. 13, 2013.
Office Action issued for Korean Patent Application No. 1 0-2014-7005898, dated May 12, 2014.
Malek Naderi et al., Metal Forming, Steel Research Int. 79 (Jul. 20, 2007) No. 2, pp. 77-84.
The Audi Q5, a New Member of the Audi B Model Range, published Oct. 23, 2008.

* cited by examiner

BODY STRUCTURE, IN PARTICULAR FLOOR STRUCTURE, FOR A MOTOR VEHICLE

CROSS-REFERENCE TO RELATED APPLICATIONS

This application is a divisional of U.S. patent application Ser. No. 13/697,492, filed Mar. 22, 2013, which is a National Phase Application of PCT International Application No. PCT/EP2011/002292, International Filing Date May 9, 2011, which claims priority to German Patent Application No. 10 2010 019 992.3, filed May 10, 2010, the entirety of which are hereby incorporated by reference.

FIELD OF THE INVENTION

The invention relates to a car body structure, especially a substructure, for a motor vehicle.

BACKGROUND OF THE INVENTION

In the realm of automotive construction, continuous efforts are being made to lower the weight of vehicles or, while improving the features available, to prevent the vehicle weight from increasing. However, this can only be achieved by reducing the weight of certain vehicle components. Here, an effort is especially being made to greatly reduce the weight of the body-in-white in comparison to earlier car body designs. At the same time, however, more and more requirements are being made in terms of safety, especially passenger safety, in the vehicle as well as in terms of the behavior of the car body structure in case of a collision. Thus, in particular, the requirement exists that the body-in-white should weigh less while continuing to have a high or even greater strength and stiffness along with defined deformation behavior. In order to meet these requirements, car bodies are used in modern automotive construction employing components made of light metal as well as car body components made of sheet steel.

In this context, it is also a generally known procedure to make certain car body sheet steel components out of hot-worked metal sheets that exhibit a higher strength than cold-worked sheet metal components. The use of such hot-worked, high-strength or ultra-high-strength components can yield a greater strength for certain car body sections. Such hot-worked metal sheets are also referred to in automotive construction as press-hardened sheet metal components. Consequently, the expressions "press hardening" and "hot working" will be used synonymously below to refer in broad terms to sheet metal components that have greater strength in comparison to cold-worked metal sheets.

For example, the use of such hot-worked or press-hardened sheet metal components is already known from German patent DE 10 2004 037 789 B3, in which an underbody for the body of a motor vehicle has a floorpan with a foot well, a tunnel running in the lengthwise direction of the vehicle, as well as joining sections for the front and rear longitudinal chassis beams. The floorpan here is made of a one-piece, shaped sheet metal blank, whereby certain areas having a greater strength in comparison to other areas of the floorpan are provided in order to define the deformation behavior. For this purpose, the areas of greater strength are partially hot-worked as well as quenched and tempered. The areas of greater strength can be arranged in the foot well or on the tunnel. If side skirts have been are shaped onto the floorpan, these can also be hot-worked as well as quenched and tempered. The same applies to seat cross beams that are shaped in the floorpan. Those areas of the one-piece sheet metal blank onto which front or rear longitudinal chassis beams are to be attached can also be hot-worked with a rolling technique so as to acquire a higher strength. A structure similar to that of German patent DE 10 2004 037 789 B3 is also known from German patent DE 10 2004 044 925 B3.

The use of hot-worked metal sheets is also known from German patent application DE 10 2004 021 553 A1 in which a hollow longitudinal chassis beam is made up of two individual profiles, whereby the individual profiles have different strength values.

Furthermore, European patent application EP 1 382 514 A1 discloses a substructure for vehicles in which each seat cross beam of the substructure consists of a center beam profile that is arranged crosswise to the longitudinal axis of the vehicle and that, at its ends, has hat-shaped seat mounts facing in the lengthwise direction of the vehicle, whereby each seat mount that is arranged on the tunnel side is configured as a reinforcement element for the transmission tunnel and extends into the outer contour of the transmission tunnel.

SUMMARY OF THE INVENTION

Before this backdrop, it is the objective of the present invention to put forward a car body structure, especially a substructure, for a motor vehicle that, in conjunction with the use of car body components with a favorable design in terms of their weight, continues to exhibit excellent deformation behavior in a wide array of collision situations.

This objective is achieved by the features of the claims. Advantageous refinements are the subject matter of the claims recited hereinafter.

According to one aspect of the invention, a car body structure, especially a substructure, is being proposed for a motor vehicle, with beam components that create defined load paths in collision situations, said car body structure being characterized according to the invention in that the beam components situated in the area of at least one defined load path—especially a head-on collision load path and/or a side collision load path and/or a rear-end collision load path—at least partially comprise high-strength beam components, preferably completely through-hardened or partially through-hardened high-strength beam components, made out of a hot-worked or press-hardened steel sheet, said beam components being joined to each other directly or indirectly, preferably directly, especially being joined to each other positively or non-positively or by bonding, whereby it is also preferably provided that the car body components or cladding that are not situated in the area of the defined load path(s) are made, at least partially, of a low-strength steel material in comparison to the high-strength beam components and/or of a light metal and/or, if applicable, even of a plastic material such as, for example, a fiber-reinforced plastic material.

Consequently, with such a solution according to the invention, a systematic use of hot-worked or press hardened steel sheets is achieved in the areas that are highly stressed in case of collision in order to reduce the deformation in those areas where the car body structure is supposed to sustain little or no deformation in a defined collision situation. At the same time, the weight and the number of components of the car body structure can advantageously be reduced and consequently, favorable conditions can be achieved, especially in terms of $CO_2$ emissions and costs.

According to a preferred concrete first embodiment, it is provided that the high-strength beam components situated in the area of a head-on collision load path are each formed at least by a longitudinal chassis beam component situated on each of the opposite sides of the vehicle relative to the crosswise axis of the vehicle, and/or by a skirt component, preferably an inner skirt component, situated on each of the opposite sides of the vehicle relative to the crosswise axis of the vehicle, and/or by an A-pillar component situated on each of the opposite sides of the vehicle relative to the crosswise axis of the vehicle, and/or by a transmission tunnel component running in the lengthwise direction of the vehicle, and/or by a foot well cross beam running in the crosswise direction of the vehicle. In particular, the combination of all or most of the above-mentioned components forms a high-strength assembly of components that is excellently suited to allow little or no deformation in case of a head-on collision.

Here as well as below, the term "inner component" is to be understood primarily as referring to a component that, in the mounted state relative to its position in the vehicle, is situated more towards the inside of the vehicle than an associated outer component of the same module.

Here, it has proven to be especially advantageous for the high-strength longitudinal chassis beam component to be formed by a longitudinal chassis beam extension that adjoins a front longitudinal chassis beam, preferably a front longitudinal chassis beam that is made of a comparatively low-strength steel material, and for said longitudinal chassis beam extension to be joined directly or indirectly, preferably directly, to the high-strength A-pillar component and/or to the high-strength skirt component and/or to the high-strength foot well cross beam. Since, in a manner of speaking, only the longitudinal chassis beam extension is made of a high-strength steel material, the front longitudinal chassis beam that adjoins it towards the front can be a longitudinal chassis beam having a favorable weight and a defined denting or crash behavior via which, in case of a head-on collision, forces can be optimally absorbed and introduced into the head-on collision load path consisting primarily of high-strength components. Particularly in conjunction with such a structure, it is advantageous for the high-strength skirt component to be joined preferably directly to the high-strength A-pillar component, and/or to the foot well cross beam, or for the high-strength transmission tunnel component to be joined directly or indirectly, preferably directly, to the foot well cross beam.

With such a car body structure, the head-on collision forces can be transferred in an advantageous manner via the front longitudinal chassis beams or via the high-strength longitudinal chassis beam component to the skirt, as well as via the high-strength foot well cross beam to the high-strength transmission tunnel component, resulting in an excellent force dissipation and thus an especially favorable deformation behavior in case of a head-on collision. In this context, it should be explicitly pointed out that the hot-working or press hardening of individual high-strength beam components is concurrently associated with a marked reduction of the number of components; thus, within the scope of the production process, the high-strength components such as, for instance, the high-strength transmission tunnel component, can be produced by means of the tailored rolled blank method with different material thicknesses as well as especially in one piece, so that there is no need for complex sheet metal constructions that make use of additional metal reinforcement sheets.

The crash behavior of the car body according to the invention in case of a head-on collision can be improved even further in that a first front longitudinal chassis beam made of a low-strength steel material is arranged on each of the sides of the vehicle that are opposite from each other in the crosswise direction of the vehicle, and each one of these adjoins a high-strength longitudinal chassis beam extension that, in the vertical axis direction of the vehicle, is joined to a lower section of the high-strength A-pillar component that extends approximately above the door height, whereas, at the same time, another, second front longitudinal chassis beam extending approximately in the lengthwise direction of the vehicle is joined to an upper section of the high-strength A-pillar component. This second front longitudinal chassis beam preferably runs in the vertical axis direction of the vehicle above, and/or, as seen in the crosswise axis direction of the vehicle, further towards the outside than each associated first longitudinal chassis beam. Thanks to such a double longitudinal chassis beam arrangement on each of the opposite sides of the vehicle, especially in case of head-on collision situations with a side component, the result is that the force is advantageously introduced via two lateral longitudinal chassis beams, namely, once from the top relative to the vertical axis direction of the vehicle and once from the bottom of the A-pillar component, so that the introduced head-on collision forces can be advantageously already divided up here and subsequently transferred to the other load-bearing as well as essentially high-strength components.

Concretely speaking, the components or cladding, preferably a front wall, highly preferably a front wall joined to the high-strength foot well cross beam, that run in the area between the two opposite A-pillar components, and/or a cross beam near the windshield, preferably a cross beam joined to a front wall, can be made of a low-strength steel material and/or of a light metal or, if applicable, even of a plastic material, and they can be joined directly or indirectly to the high-strength A-pillar component and/or to the high-strength longitudinal chassis beam extensions and/or to the second longitudinal chassis beams and/or to the high-strength foot well cross beam, as a result of which a car body structure with a favorable design in terms of weight and with a compact structure is obtained that is optimized in terms of its head-on collision behavior.

In this context, it is also advantageous for the components or cladding, preferably a wheel well component and/or a front strut tower component, that are provided or joined in the area between the two longitudinal chassis beams or between the longitudinal chassis beams and/or the longitudinal chassis beam extension, are made of a low-strength steel material and/or of a light metal or, if applicable, even of a plastic material such as, for example, a fiber-reinforced plastic material.

Even further optimized crash behavior is obtained with an embodiment in which, in the mounted state, a longitudinal chassis beam section extending into the passenger compartment area adjoins the high-strength longitudinal chassis beam extension, whereby said longitudinal chassis beam section runs approximately parallel to the high-strength transmission tunnel component and/or to the high-strength skirt components, and/or is made of a low-strength steel material or of a light metal or of a plastic material, and/or extends approximately to a rear heel plate and/or to a rear cross beam component of the passenger compartment, and/or passes through or engages underneath the foot well cross beam, in particular, it engages underneath it and supports it. Thanks to such a longitudinal chassis beam section that is situated on the passenger compartment side and that has a favorable design in terms of weight, the head-on collision forces are not only distributed to the high-strength transmission tunnel or the high-strength skirt components but also advantageously transferred to these additional longitudinal chassis beam sections, resulting in a high-grade force dissipation that is distributed over numerous force flow paths via essentially the entire underbody, without this underbody having to be manufactured in one piece.

As already mentioned in conjunction with the high-strength transmission tunnel component, it is especially advantageous that high-strength beam components can be produced by hot-working or by press-hardening, thereby also reducing the number of components. This also applies to the formation of the foot well cross beam, which is fundamentally made in one piece, but preferably in two pieces consisting of cross beam components that extend between the opposite sides of the vehicle and/or consisting of one-piece cross beam components joined to each other. As an alternative or in addition to this, the high-strength A-pillar component can also comprise a one-piece component running inside as well as below the beltline relative to the position in the vehicle.

According to a preferred second embodiment of the present inventive idea, it is provided that the high-strength beam components situated in the area of a defined side collision load path are each formed at least by a preferably inner skirt component situated on each of the opposite sides of the vehicle relative to the crosswise axis of the vehicle, and/or by a front foot well cross beam running in the crosswise direction of the vehicle relative to the lengthwise direction of the vehicle, and/or by a rear beam, especially a heel plate, running in the crosswise direction of the vehicle relative to the lengthwise direction of the vehicle, and/or by a seat cross beam running in the crosswise direction of the vehicle. Here, the front high-strength foot well cross beam and/or the high-strength seat cross beam and/or the high-strength heel plate can be joined directly or indirectly, preferably directly, to the high-strength skirt component. Furthermore, as an alternative or in addition to this, it can be provided that the seat cross beam is joined directly or indirectly to a high-strength transmission tunnel component that, as seen in the lengthwise direction of the vehicle, extends between the foot well cross beam and the heel plate, and that is joined directly or indirectly to the foot well cross beam and/or to the heel plate. Moreover, as an alternative or in addition to this, the foot well cross beam and/or the skirt component can be joined directly or indirectly, preferably directly, to an A-pillar component that preferably extends from the skirt component to the beltline of a vehicle.

With these measures, especially with the combination of all or at least most of these measures, the side impact forces can be advantageously distributed, absorbed and dissipated via the appertaining skirt component to the foot well cross beam or to the seat cross beam and the heel plate.

In this context, another concrete embodiment that is especially advantageous is one in which the high-strength beam components situated in the area of a side collision load path form an approximately ring-shaped or rectangular frame that is made up of high-strength beam components and that runs along the bottom and/or on the passenger compartment side. Preferably, in conjunction with such a ring-shaped structure, it is provided that, in order to create a mesh-like or grid-like structure, if applicable, at least another high-strength beam component, preferably a high-strength transmission tunnel and/or at least a high-strength seat cross beam extending in the crosswise direction of the vehicle or in the lengthwise axis direction of the vehicle, runs like a strut in or within the frame and/or is directly or indirectly joined to it.

Therefore, also with such a structure, the components or cladding, especially a bottom wall, situated in the area between the opposite skirt components, and/or between the transmission tunnel component and the skirt components, and/or between the foot well cross beam and the rear beam, especially the heel plate, can advantageously be made of a low-strength steel material and/or of light metal, and/or, if applicable, even of a plastic material, so as to yield a favorable design in terms of weight. This results in the above-mentioned disadvantages of a car body that is structured with a favorable design in terms of its weight and with optimized crash behavior.

According to another preferred concrete embodiment, it is proposed that the high-strength beam components situated in the area of a defined rear-end collision load path each are formed at least by a rear or back longitudinal chassis beam situated on each of the opposite sides of the vehicle relative to the crosswise axis of the vehicle, and/or by a rear, preferably one-piece, cross beam running in the crosswise axis direction of the vehicle relative to the lengthwise direction of the vehicle, and/or by a preferably one-piece heel plate running in the crosswise axis direction of the vehicle, and/or by a preferably inner skirt component situated on each of the opposite sides of the vehicle relative to the crosswise axis of the vehicle.

In this context, it is especially advantageous for the high-strength rear longitudinal chassis beams to be joined directly or indirectly, preferably directly, to the associated high-strength skirt component and/or to the high-strength rear cross beam and/or to the high-strength heel plate and/or to a longitudinal chassis beam section that is situated on the passenger compartment side and that will still be elaborated upon below. As an alternative or in addition to this, the heel plate can be joined directly or indirectly, preferably directly, to each associated high-strength skirt component, and/or to the high-strength rear cross beam and/or to a preferably high-strength transmission tunnel and/or to a longitudinal chassis beam section that is situated on the passenger compartment side and that will still be elaborated upon below.

With such a structure of the rear car body section, a reliable force division and force distribution are achieved in case of a rear-end collision, since, due to the rear longitudinal chassis beams, the rear-end collision forces can be divided and distributed into the skirt components or into the longitudinal chassis beam sections on the passenger compartment side as well as into the heel plate or into the rear cross beam, thus advantageously being divided and distributed in as many different ways as possible. As a result, large collision forces, as also described for the two above-mentioned side collision or head-on collision load paths, can advantageously be absorbed with very little deformation and thus with optimized passenger protection.

The above-mentioned longitudinal chassis beam section on the passenger compartment side is preferably formed by an extension of a front longitudinal chassis beam component, especially by a longitudinal chassis beam section that adjoins a high-strength longitudinal chassis beam component arranged at the front of the vehicle, whereby it is preferably provided that the longitudinal chassis beam section on the passenger compartment side is made of a low-strength steel material, and/or of a light metal, and/or of a plastic. The high-strength longitudinal chassis beam component arranged at the front of the vehicle, in turn, preferably adjoins a front longitudinal chassis beam that, in comparison, is low-strength and/or made of a light metal or of a plastic material, as was extensively described above in conjunction with the discussion of a preferred head-on collision load path.

According to another preferred embodiment, it is provided that, as seen in the lengthwise direction of the vehicle as well as towards the back in the direction of the rear of the vehicle, the high-strength skirt component is lengthened beyond the heel plate with a skirt component extension that is made of a comparatively low-strength steel material, and/or of a light metal, and/or even of a plastic material, and via this skirt component extension, it is joined directly or indirectly, preferably directly, to the associated rear high-strength longitudinal chassis beam and/or to the high-strength rear cross beam. This results in an especially preferred fastening option that has a simple and cost-effective structure and that is also highly functionally reliable.

Moreover, the high-strength skirt component can be joined directly or indirectly, preferably directly, to the high-strength rear cross beam in order to form an assembly of components having an altogether very high strength. All in all, it is especially advantageous here to select a geometry with which the high-strength rear longitudinal chassis beams that create the rear-end collision load path along with the high-strength skirt components on the passenger compartment side, on the one hand, and the high-strength rear cross beam and/or the high-strength heel plate on the other hand form a bottom high-strength H-shaped structure.

Also in conjunction with such a rear-end collision load path, it is, in turn, advantageous for the components and/or cladding, especially a bottom wall and/or a seat cross beam on the back seat side that are located and/or arranged in the area between the opposite rear high-strength longitudinal chassis beams and/or the high-strength heel plate or the rear cross beam, or which are joined there directly or indirectly, to be made of a comparatively low-strength steel material and/or of a light metal and/or, if applicable, even of a plastic material. This results, in turn, in the advantages described above in conjunction with the side collision and head-on collision load paths when it comes to a favorable design in terms of weight.

It goes without saying that the component features discussed above and claimed in the claims can be replaced and/or combined with each other as desired in order to achieve a car body structure that is optimized for the particular application purpose. Fundamentally, however, in a car body, it is also possible to implement just one of the load path configurations described above or else two of the load path configurations discussed above in greater detail, for example, the head-on collision load path and the side collision load path, or the side collision load path and the rear-end collision load path, or else the head-on collision load path and the rear-end collision load path. However, special preference is given to a car body design in which all of the load path configurations discussed above have been implemented, since in this manner, a high-strength beam component structure is provided precisely in the areas that are highly stressed in case of a collision so that the deformations can be reduced where the car body structure is supposed to allow little or no deformation in case of a collision, at the same time reducing the weight and the number of components, and thus the costs.

The high-strength beam components, as already described in detail above, can be produced, for instance, by means of the so-called tailored blank method, in which the high-strength components can be configured with different material qualities or sheet thicknesses. The use of the tailored rolled blank method is especially advantageous here in order to produce precisely manufactured sheet metal components.

Preferably, the high-strength hot-worked or press-hardened components are produced in such a way that steel blanks or pre-shaped steel components are pressed while red-hot and are subsequently cooled off within seconds. The rapid cooling brings about a structural change in the material and ensures extreme strength for the car body components. Weight savings, a high level of collision safety, and a positive energy balance are additional advantages of such a method execution. Concretely speaking, during the production of the high-strength beam components according to the invention, within the scope of the press hardening, the individual steel component or sheet metal component is heated in a furnace, for example, in a roller conveyor furnace, to a temperature of more than 900° C. [1652° F.]. Subsequently, a robot arm grips the glowing component that is rolling down and places it into a water-cooled mold. The press closes and, within a defined period of time, for example, from 10 to 15 seconds, the component is cooled down to, for instance, 170° C. [338° F.]. Then a robot removes the cooled and hardened components and conveys them into transport racks.

Due to the complete or at least partial through-hardening of the components, additional advantageous component properties can be established exactly where this is necessary, for example, on a high-strength component, areas with different levels or degrees of hardness, or else high-strength components with different levels or degrees of hardness can be created.

BRIEF DESCRIPTION OF THE DRAWINGS

The invention will be explained below in greater detail with reference to a drawing. The following is shown:

FIG. 1 shows an embodiment by way of an example of a substructure 1 according to the invention for a car body in an exploded view in which the individual components are very clearly visible. In FIG. 2, the assembled state of this substructure 1 is shown in a perspective view.

Figure 1:
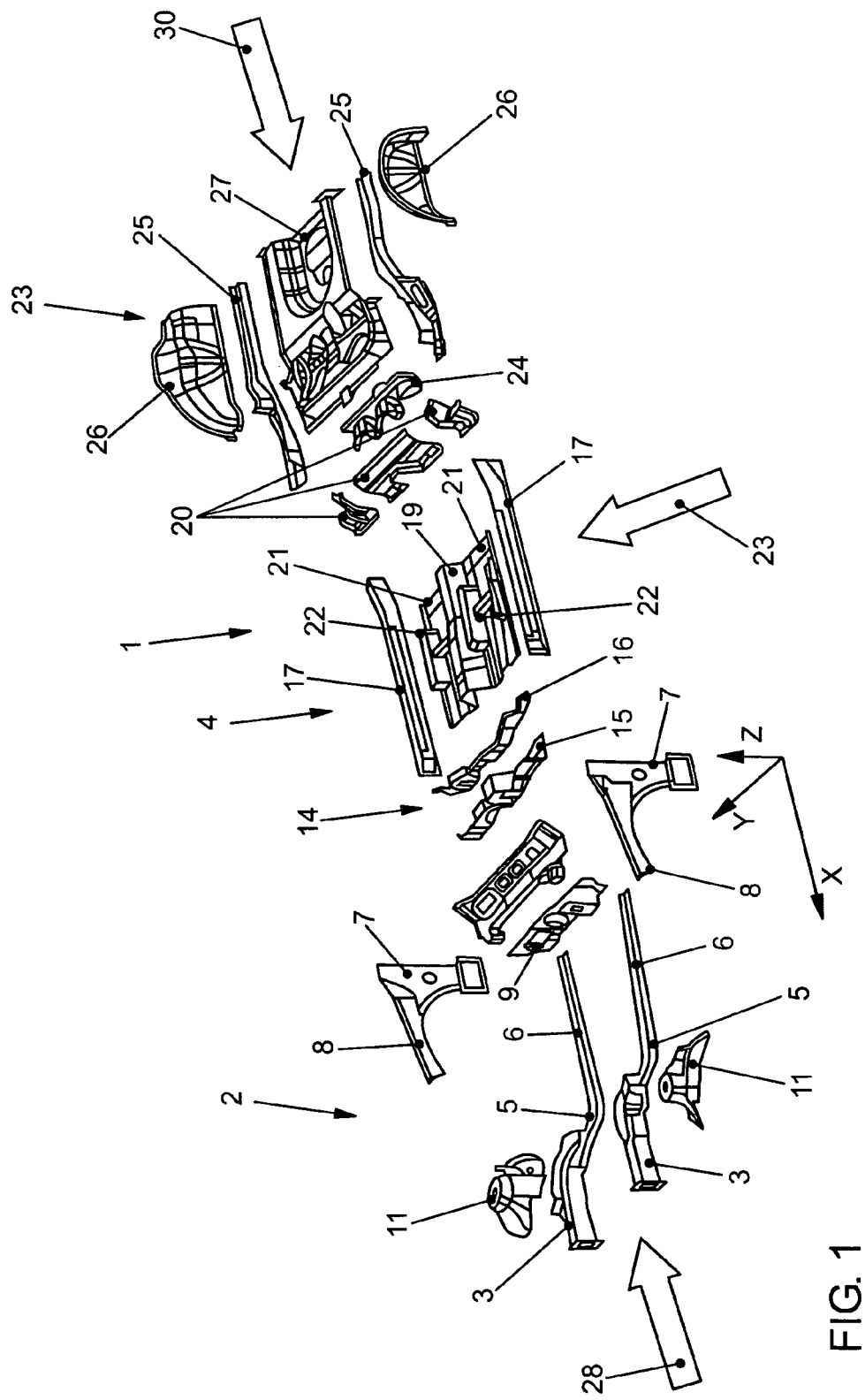
FIG. 1 shows a schematic exploded view of an underbody of a car body according to the invention.

In detail, the substructure 1 has the following configuration:

In a front vehicle area 2, the substructure 1 has two front, first longitudinal chassis beams 3 made of a low-strength, for example, cold-worked steel material, which adjoin a hot-worked or press-hardened and thus high-strength longitudinal chassis beam extension 5, as seen in the lengthwise axis direction x of the vehicle.

The longitudinal chassis beam extension 5, which can be optionally curved, for example, towards the outside (FIG. 2), adjoins a longitudinal chassis beam section 6 that, in the assembled state, extends into the passenger compartment area 4 and that is made, for example, of a low-strength steel material.

Figure 2:
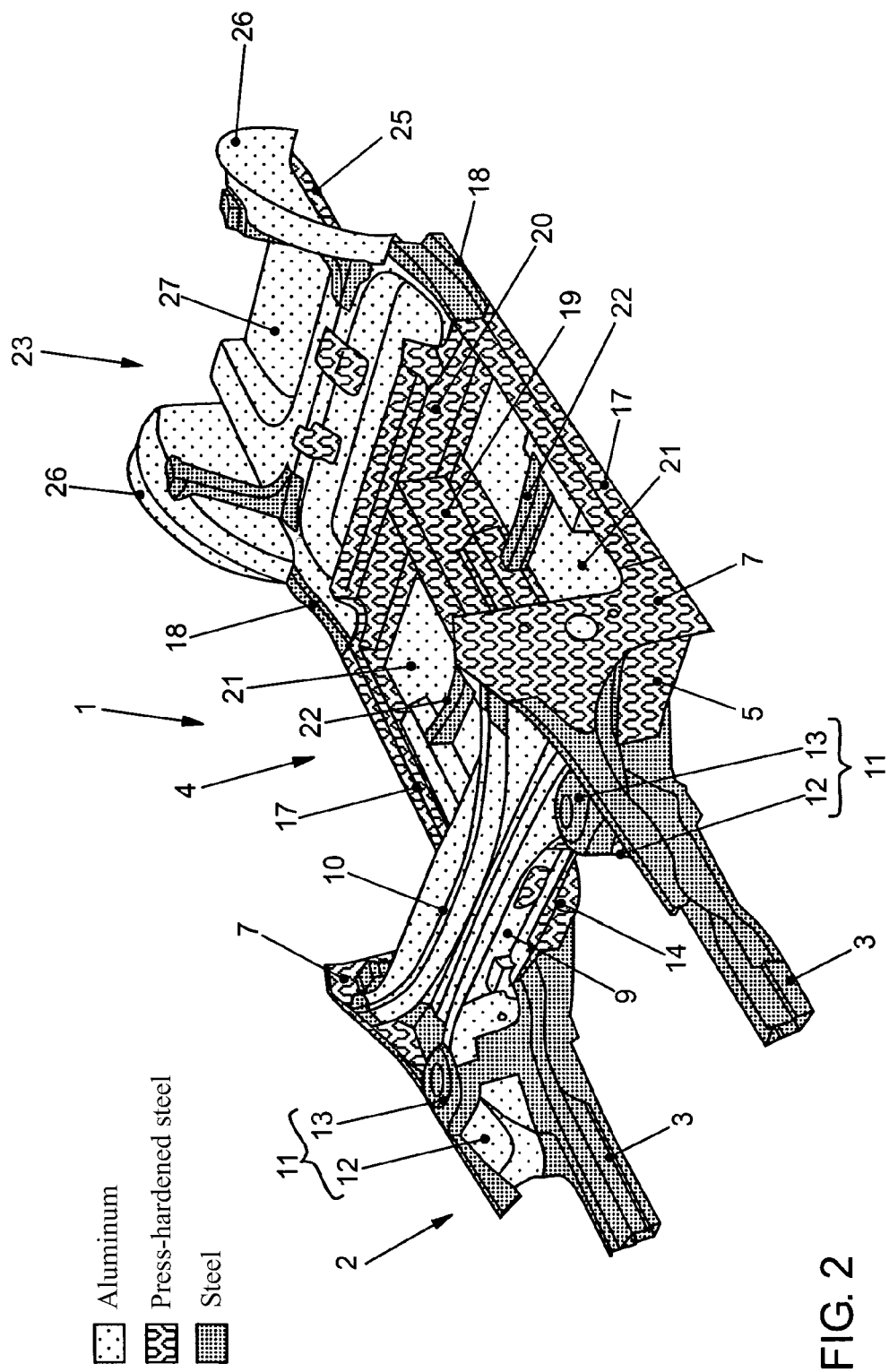
FIG. 2 shows the car body of the schematic exploded view of FIG. 1, in the assembled state.

As can be seen especially clearly in FIG. 2, on the opposite sides of the vehicle in the crosswise direction y of the vehicle, an A-pillar component 7 made out of a hot-worked or press-hardened steel material is joined to the longitudinal chassis beam extension 5 made of a high-strength steel material, said A-pillar component 7 extending upwards in the vertical axis direction z of the vehicle. Here, the longitudinal chassis beam extension 5 is joined to a lower pillar section (see especially FIG. 2) relative to the vertical axis direction of the vehicle, while a second front longitudinal chassis beam 8 made of a lower-strength steel material than the high-strength A-pillar component 7 adjoins an upper pillar section, said longitudinal chassis beam 8 extending forward in the lengthwise axis direction x of the vehicle and being arranged approximately parallel to or more toward the vehicle side at a distance from the first front longitudinal chassis beam.

DETAILED DESCRIPTION OF THE INVENTION

In the area between the two longitudinal chassis beams 3, 8 or the A-pillar components 7, first of all, there is a front wall 9 and secondly, a cross beam 10 running above the front wall 9 or joined to it near the windshield, both of which are preferably made of a light metal, for example, aluminum.

Moreover, in the front vehicle area 2, in the area between the first longitudinal chassis beam 3 and the second longitudinal chassis beam 8, there are additional substructure components, specifically, a wheel well and front strut tower 11, that can be made, for example, of a single material, namely, an aluminum or a low-strength steel material or else as a mixed construction consisting of an aluminum component 12 and a steel component 13, as is shown schematically only in FIG. 2.

For example, a two-part foot well cross beam 14 made out of a hot-worked or press-hardened high-strength steel material runs in the area of the front wall 9 or in the area between the two A-pillar components 7, whereby the two cross beam components 15, 16 are firmly joined together and each extend as a one-piece component essentially over the entire width of the car body, as seen in the crosswise direction of the vehicle.

Moreover, an inner skirt 17 extending over the passenger compartment area 4 in the lengthwise axis direction x of the vehicle is arranged or joined, in the area of the foot well cross beam 14 or in the area of the A-pillar component 7, said inner skirt 17 likewise being made of a high-strength hot-worked or press-hardened material. As seen in the lengthwise direction of the vehicle, this high-strength inner skirt 17 extends up to a heel plate 20, which is configured in several pieces, as shown in FIG. 1. This heel plate 20, however, can also be configured in one piece, as shown in FIG. 2, and can be made of a high-strength hot-worked or press-hardened steel material.

Another difference between the two variants shown in FIGS. 1 and 2 is that, in the embodiment shown in FIG. 2, at its rear end as seen in the lengthwise direction of the vehicle, the inner skirt 17 also has a skirt component extension 18 joined thereto that is made, for example, of a low-strength steel material.

As can also be seen in the two figures, a one-piece transmission tunnel 19 made of a high-strength hot-worked or press-hardened steel material is provided in the passenger compartment area 4, and it runs between the foot well cross beam 14 and the heel plate 20 or is joined there.

Bottom metal sheets 21 made of a low-strength steel material adjoin the transmission tunnel 19 on both sides towards the appertaining skirt 17.

Furthermore, as seen in the crosswise direction y of the vehicle, seat cross beams 22 can be arranged in the area between the transmission tunnel 19 and the inner skirt 7 or can be indirectly or directly joined to them, and said seat cross beams 22 can likewise preferably be made of a press-hardened, hot-worked and thus high-strength material or else of a low-strength steel material.

Moreover, in the rear vehicle area 23, there is a rear cross beam 24 made out of a hot-worked or press-hardened and thus high-strength steel material that is arranged approximately parallel to the heel plate 20 and that runs in the area between two rear longitudinal chassis beams 25 that are arranged on each of the opposite sides of the vehicle, said longitudinal chassis beams 25 likewise being made out of a hot-worked or press-hardened and thus high-strength steel material.

These rear longitudinal chassis beams 25 are firmly joined, for example, to the heel plate 20 or to the rear cross beam 24 and/or to the inner skirt 17 or to its skirt component extension 18.

Furthermore, wheel wells 26 made, for instance, of a light metal such as aluminum, are arranged in the area of the rear longitudinal chassis beams 25, while a bottom metal sheet 27 made, for instance, of a low-strength steel material, extends in the area between the two rear longitudinal chassis beams 25. In the mounted state, as shown in FIG. 2, a partial section of this bottom metal sheet 20 covers the rear cross beam 24 towards the heel plate 20 and can thus preferably be appropriately supported from below.

In the mounted state, the two longitudinal chassis beam sections 6 on the passenger compartment side preferably extend to the heel plate 20 and are joined to it indirectly or preferably directly.

Figure 3:
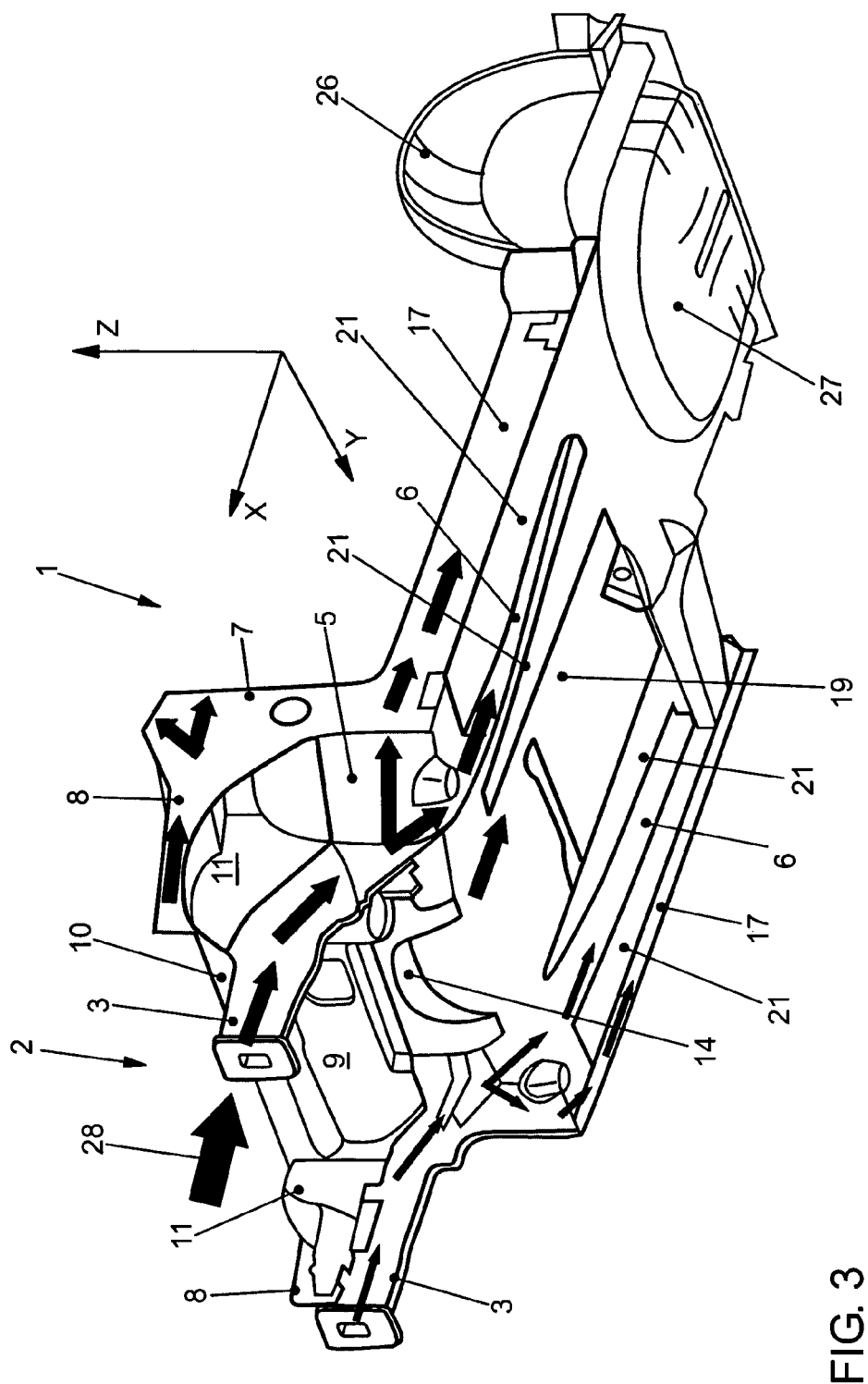
FIG. 3 shows the underbody of the car body according to FIG. 2, in case of a head-on collision.
Figure 4:
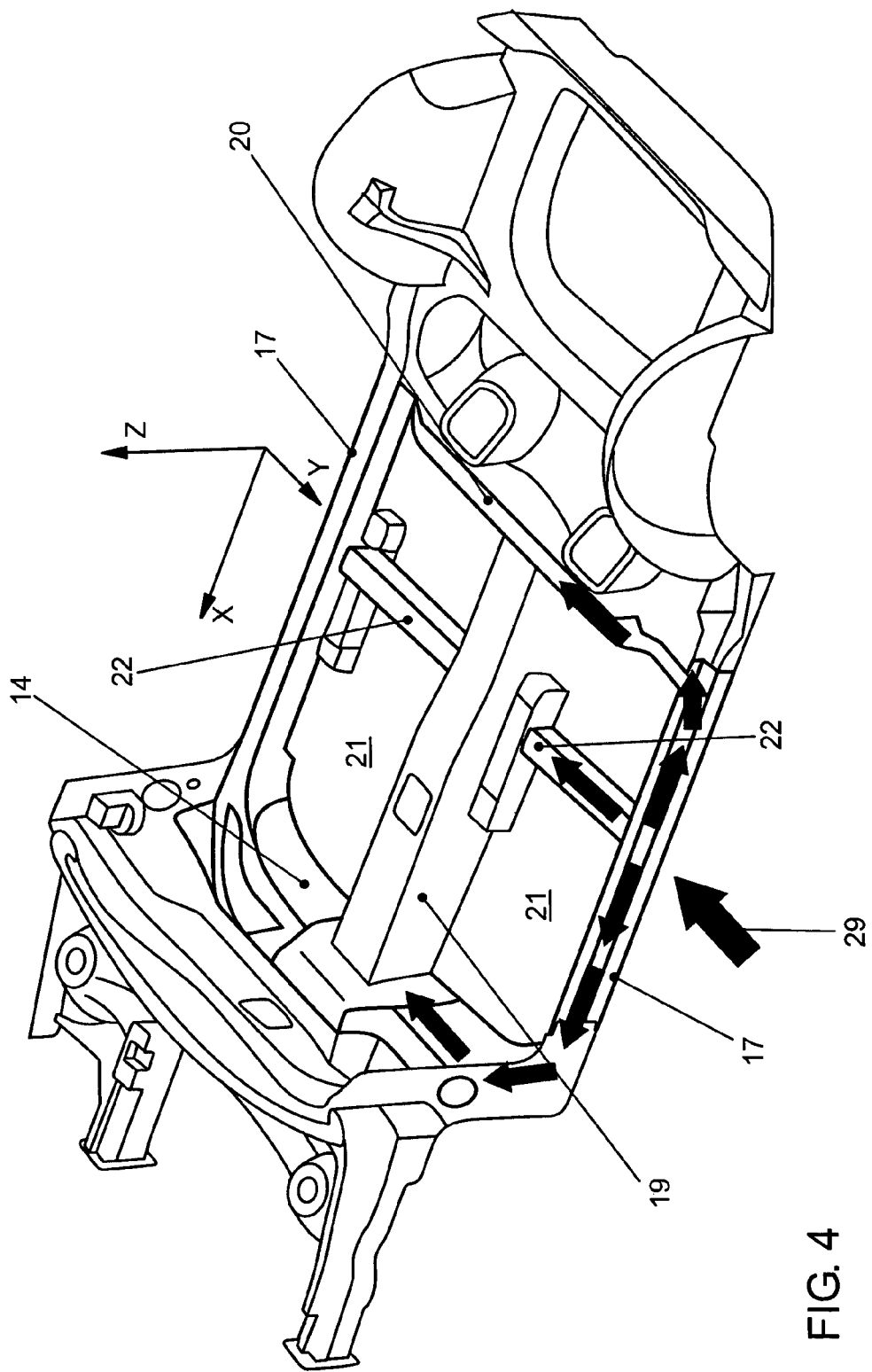
FIG. 4 shows the underbody of the car body according to FIG. 2, in case of a side collision.
Figure 5:
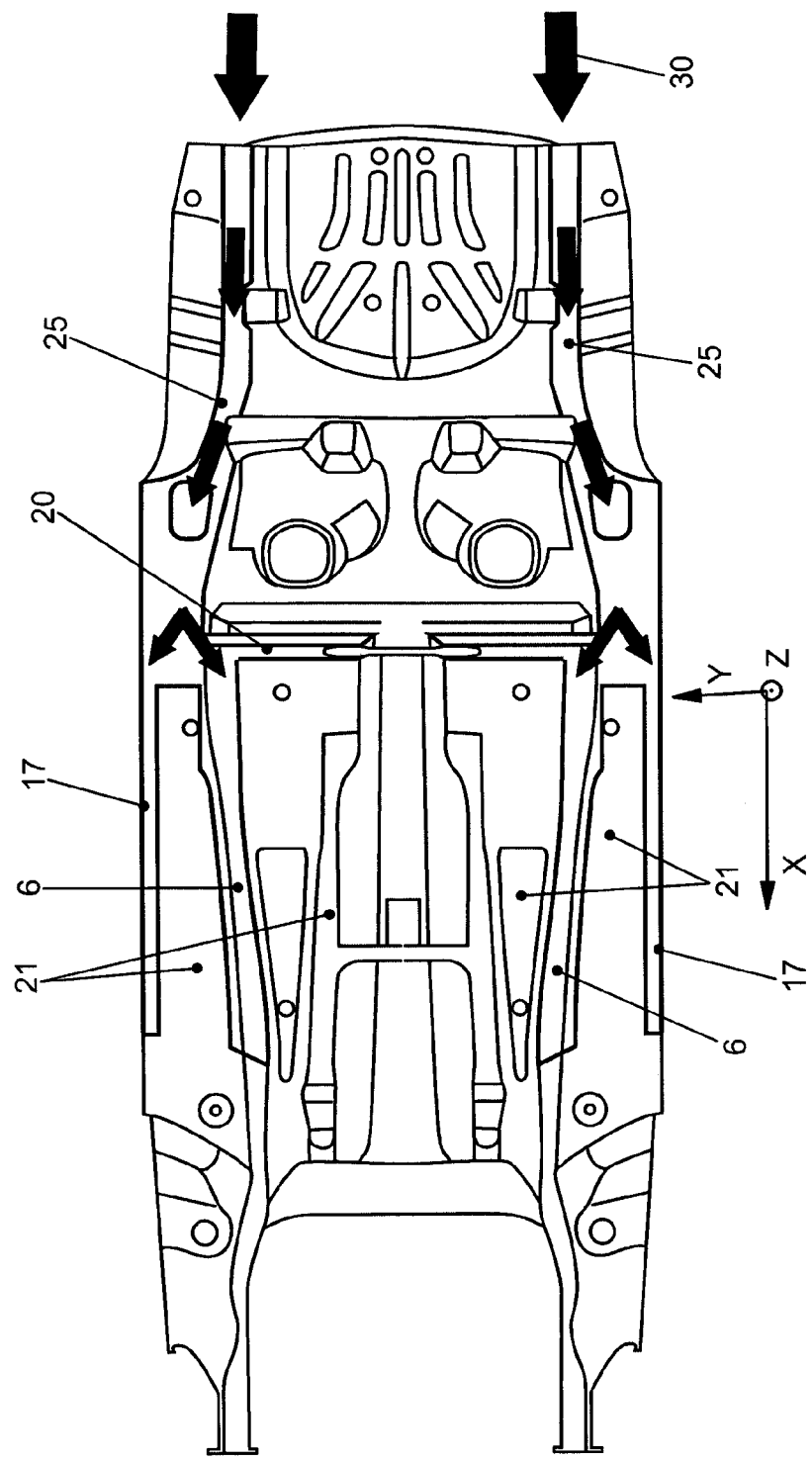
FIG. 5 shows the underbody of the car body according to FIG. 2, in case of a rear-end collision.

Thus, all in all, a substructure 1 is formed that is configured so as to be optimized for a head-on collision 28, a side collision 29 and a rear-end collision 30 in such a way that the load paths specified for these individual collision situations, via which the main acting forces, especially the force maxima of the collision forces, are transferred, consist mainly or even completely of hot-worked or press-hardened and thus high-strength beam components, which will be explained below in conjunction with FIGS. 3 to 5.

FIG. 3 shows a schematic perspective bottom view of the substructure 1 in the case of a head-on collision in which the forces introduced via the two front longitudinal chassis beams 3, 8 are first transferred via the longitudinal chassis beam extension 5 into the lower pillar area of the A-pillar component 7, and subsequently, from there, to the inner skirt 17 or, starting from the beam extension 5, to the foot well cross beam 14 and to the longitudinal chassis beam section 6 on the passenger compartment side. Moreover, starting from the foot well cross beam 14, force is also dissipated via the high-strength transmission tunnel 19.

This is shown in FIG. 3 by the arrows that show the force flow extremely schematically and by way of an example.

As can also be seen in FIG. 3, the force introduced via the second front longitudinal chassis beam 8 is introduced into the A-pillar component 7, namely, either upward into the upper A-pillar (not shown here) or else downward in the direction of the longitudinal chassis beam extension 5, to the foot well cross beam 14 and/or to the inner skirt 17.

Consequently, this force distribution possibility shown in FIG. 3 brings about an optimized force flow and thus an optimized force dissipation in a head-on collision situation essentially via the high-strength beam components of the substructure 1, while the remaining cladding or car body components that are not situated in the main flow can consequently be made of low-strength steel material and/or of aluminum, which means a more favorable design in terms of weight and cost.

In principle, the same applies to the side collision situation shown in FIG. 4, in which the force introduced via the inner skirt component 17 can be dissipated in a ring-shaped pattern via the foot well cross beam 14 or the heel plate 20 as well as via the seat cross beam 22.

The statements made above regarding the head-on collision situation apply identically here.

By the same token, the statements above apply to the rear-end collision situation shown in FIG. 5, in which the forces introduced via the rear longitudinal chassis beam 25, as seen in the lengthwise direction x of the vehicle, can be distributed and dissipated essentially in an H-shaped pattern via the inner skirt 17 or via the longitudinal chassis beam sections 6 on the passenger compartment side as well as also via the heel plate 20 or the rear cross beam 24.

LIST OF REFERENCE NUMERALS 1 substructure
2 front vehicle area
3 first, front longitudinal chassis beam
4 passenger compartment area
5 longitudinal chassis beam extension
6 longitudinal chassis beam section
7 A-pillar component
8 second, front longitudinal chassis beam
9 front wall
10 cross beam
11 wheel well and front strut tower
12 aluminum component
13 steel component
14 foot well cross beam
15 first cross beam component
16 second cross beam component
17 inner skirt
18 skirt component extension
19 transmission tunnel
20 heel plate
21 bottom metal sheet
22 seat cross beam
23 rear vehicle area
24 rear cross beam
25 rear longitudinal chassis beam
26 wheel well
27 bottom metal sheet
28 head-on collision
29 side collision
30 rear-end collision

The invention claimed is:

1. A body structure for a vehicle comprising:
vehicle components configured to create a defined load path in rear-end collision situations, said vehicle components comprising:
a rear longitudinal chassis beam situated on each of two opposing sides of the vehicle, said longitudinal chassis beam being connected, directly or indirectly, to a longitudinal chassis beam section situated on a passenger compartment side of the vehicle,
a skirt component situated on each of the two opposing sides of the vehicle,
a rear cross beam that runs in a direction of a crosswise axis of the vehicle, relative to a lengthwise direction of the vehicle, and
a heel plate that runs in the direction of the crosswise axis of the vehicle,
wherein each of said rear longitudinal chassis beam, skirt component, rear cross beam and heel plate are made of a high-strength hot formed and/or press-hardened material, and
wherein said vehicle components are configured to divide and dissipate rear-end collision forces introduced via the rear cross beam and via the heel plate onto the skirt component and onto the longitudinal chassis beam section.

2. The body structure according to claim 1, wherein the vehicle further comprises additional vehicle components not configured to create the defined rear-end collision load path, wherein said additional vehicle components are made of a low-strength material relative to the high-strength hot formed or press-hardened material.

3. The body structure according to claim 1, wherein the longitudinal chassis beam section is made of low-strength steel material.

* * * * *